United States Patent
McCracken et al.

(10) Patent No.: US 12,513,188 B2
(45) Date of Patent: Dec. 30, 2025

(54) METHOD AND SYSTEM FOR PROTECTING A CHECKOUT TRANSACTION FROM MALICIOUS CODE INJECTION

(71) Applicant: Shopify Inc., Ottawa (CA)

(72) Inventors: Jack McCracken, Ottawa (CA); Peter Yaworski, Aurora (CA); Zachary Deveau, Montreal (CA)

(73) Assignee: Shopify Inc., Ottawa (CA)

( * ) Notice: Subject to any disclaimer, the term of this patent is extended or adjusted under 35 U.S.C. 154(b) by 331 days.

(21) Appl. No.: 17/185,029

(22) Filed: Feb. 25, 2021

(65) Prior Publication Data

US 2022/0272123 A1  Aug. 25, 2022

(51) Int. Cl.
*H04L 9/40* (2022.01)
*G06Q 20/40* (2012.01)

(52) U.S. Cl.
CPC ..... *H04L 63/1466* (2013.01); *G06Q 20/4016* (2013.01); *H04L 63/1416* (2013.01)

(58) Field of Classification Search
CPC ............ H04L 63/1416; H04L 63/1466; G06Q 20/4016; G06F 21/563
See application file for complete search history.

(56) References Cited

U.S. PATENT DOCUMENTS

| | | | | |
|---|---|---|---|---|
| 8,918,515 B1 * | 12/2014 | Partow-Navid | ......... | H04L 67/14 709/227 |
| 9,954,893 B1 * | 4/2018 | Zhao | ................... | H04L 63/1466 |
| 10,079,854 B1 * | 9/2018 | Scott | ....................... | H04L 67/02 |
| 10,394,689 B1 * | 8/2019 | Ledet | ....................... | H04L 67/34 |
| 11,303,670 B1 * | 4/2022 | Wueest | .................. | H04L 63/145 |
| 2009/0307224 A1 * | 12/2009 | Amin | ..................... | G06Q 10/06 707/999.102 |
| 2012/0255027 A1 * | 10/2012 | Kanakapura | ........ | H04L 63/1441 726/26 |
| 2013/0160121 A1 * | 6/2013 | Yazdani | .................. | G06F 21/54 726/23 |
| 2014/0122343 A1 * | 5/2014 | Einav | .................... | G06F 21/554 705/67 |
| 2014/0283067 A1 * | 9/2014 | Call | .................... | H04L 63/1425 726/23 |

(Continued)

OTHER PUBLICATIONS

Jamie Hayami, Canadian Intellectual Property Office (CIPO) Official Action and Examination Search Report for Application No. 3,140,893 dated Aug. 29, 2023, pp. 1 to 5.

(Continued)

*Primary Examiner* — Daniel B Potratz
*Assistant Examiner* — Matthias Habtegeorgis
(74) *Attorney, Agent, or Firm* — Moffat & Co

(57) ABSTRACT

A computer-implemented method for detecting malicious code injection into checkout operations, the method including receiving a report regarding a checkout operation; determining based on the report that a checkout operation includes one or more events satisfying a first criterion; determining that a modification of customizable software code related to the checkout operation satisfies a second criterion; and responsive to the satisfaction of the first criterion and the second criterion, providing an indication of a detection of a potential malicious code injection into the checkout operation.

18 Claims, 7 Drawing Sheets

(56) References Cited

U.S. PATENT DOCUMENTS

| | | | |
|---|---|---|---|
| 2015/0058992 A1* | 2/2015 | El-Moussa | H04L 63/1416 |
| | | | 726/24 |
| 2015/0244738 A1* | 8/2015 | Lu | H04L 63/1466 |
| | | | 726/23 |
| 2015/0269380 A1* | 9/2015 | Golovanov | H04L 63/1475 |
| | | | 726/24 |
| 2017/0006046 A1* | 1/2017 | Kuskov | H04L 63/1425 |
| 2017/0054702 A1* | 2/2017 | Turgeman | G06F 21/31 |
| 2020/0356667 A1* | 11/2020 | Rodriguez Bravo | |
| | | | G06F 21/316 |
| 2020/0382529 A1* | 12/2020 | Higgins | H04L 63/1425 |
| 2021/0133319 A1* | 5/2021 | Rodriguez Bravo | G06F 21/83 |
| 2021/0173930 A1* | 6/2021 | Dahal | H04L 63/145 |
| 2021/0203692 A1* | 7/2021 | Nunes | H04L 63/1483 |
| 2021/0209606 A1* | 7/2021 | Herlands | G06Q 20/4016 |
| 2021/0226990 A1* | 7/2021 | Devi | H04L 63/1416 |
| 2021/0385245 A1* | 12/2021 | Melson | H04L 63/1433 |
| 2022/0263828 A1* | 8/2022 | Brandel | H04L 63/20 |

OTHER PUBLICATIONS

Canadian Intellectual Property Office (CIPO) Official Action and Examination Search Report for Application No. 3,140,893 dated Jul. 31, 2024, 4 pages.

\* cited by examiner

METHOD AND SYSTEM FOR PROTECTING A CHECKOUT TRANSACTION FROM MALICIOUS CODE INJECTION

FIELD OF THE DISCLOSURE

The present disclosure relates to electronic transactions, and in particular relates to checkout operations for electronic commerce transactions.

BACKGROUND

In an electronic commerce system, it may be desirable to allow a merchant to customize aspects of a checkout operation. The customization of the checkout can be to ensure that a checkout operation meets the merchant's needs in terms of layout, information, process flow, or other factors. Other reasons for customization of a checkout operation are also possible.

Customization of the checkout operation generally involves a person authorized by the merchant editing or inserting code in files used for the checkout operation.

SUMMARY

One side effect of customization of the checkout operation is the increase in opportunity for malicious code to find its way into the checkout operation. For example, credit card skimming is when the buyer's credit card information is exfiltrated from the checkout operation to a server owned by a bad actor, for purposes of sale (to other bad actors) or fraud (using the stolen credit card details to make unauthorized purchases).

In the length of time between the code injection and a merchant's realization that their operation has been compromised, many buyer credentials can be compromised, particularly for large merchants who may have thousands of checkouts per hour.

The subject-matter of the present disclosure relates to methods and systems to facilitate the detection of malicious code in a checkout operation, where such malicious code can compromise sensitive data such as customer information and credit card details.

In one aspect, a computer-implemented method for detecting malicious code injection into checkout operations is provided, where the method may include receiving a report regarding a checkout operation; determining based on the report that a checkout operation includes one or more events satisfying a first criterion; determining that a modification of customizable software code related to the checkout operation satisfies a second criterion; and responsive to the satisfaction of the first criterion and the second criterion, providing an indication of a detection of a potential malicious code injection into the checkout operation.

In some embodiments the method may further comprise: responsive to the indication, triggering an action to mitigate the potential malicious code injection.

In some embodiments, the action may include a rollback of a code change associated with the potentially malicious code injection.

In some embodiments, the action may include locking a user account that made the modification of the customizable software code.

In some embodiments, the second criterion may include modification of customizable software code related to the checkout operation within a threshold time frame.

In some embodiments, the determining that the first criterion is satisfied may include determining that a call was made to a Uniform Resource Locator matched in a particular list.

In some embodiments, the determining that the first criterion is satisfied may include determining that a call string exceeds a threshold size.

In some embodiments, the determining that the first criterion is satisfied may include identifying a call string with sensitive information embedded therein.

In some embodiments, the determining that the second criterion is satisfied may include determining that the modification was performed using an account that has not made modifications to the checkout operation file within a defined period.

In some embodiments, the determining that the second criterion is satisfied may include determining that the modification was performed from a new location.

In some embodiments, the determining that the second criterion is satisfied may include determining that the modification was performed using a new computing device.

In some embodiments, the method may further include establishing a confidence level that a malicious activity has occurred, and wherein the action is selected based on confidence level.

In some embodiments, the method may further include analyzing the checkout operations file for malicious code segments prior to performing the action.

In some embodiments, the action may further comprise evaluating checkout operations for other shops.

In another aspect, a computer system for detecting malicious code injection into checkout operations may be provided. The computer system may comprise a processor; and a communications subsystem, wherein the computer system may be configured to: receive a report regarding a checkout operation; determine based on the report that a checkout operation includes one or more events satisfying a first criterion; determine that a modification of customizable software code related to the checkout operation satisfies a second criterion; and responsive to the satisfaction of the first criterion and the second criterion, provide an indication of a detection of a potential malicious code injection into the checkout operation.

In some embodiments, the computer system may further be configured to, responsive to the indication, trigger an action to mitigate the potential malicious code injection.

In some embodiments, the action may include a rollback of a code change associated with the potentially malicious code injection.

In some embodiments, the action may include locking a user account that made the modification of the customizable software code.

In some embodiments, the second criterion may include modification of customizable software code related to the checkout operation within a threshold time frame.

In another aspect, a non-transitory computer readable medium for storing instruction code for detecting malicious code injection into checkout operations, may be provided. The instruction code, when executed by a processor of a computer system, may cause the computer system to: receive a report regarding a checkout operation; determine based on the report that a checkout operation includes one or more events satisfying a first criterion; determine that a modification of customizable software code related to the checkout operation satisfies a second criterion; and responsive to the satisfaction of the first criterion and the second criterion, provide an indication of a detection of a potential malicious code injection into the checkout operation.

BRIEF DESCRIPTION OF THE DRAWINGS

The present disclosure will be better understood with reference to the drawings, in which.

DETAILED DESCRIPTION

Figure 1:
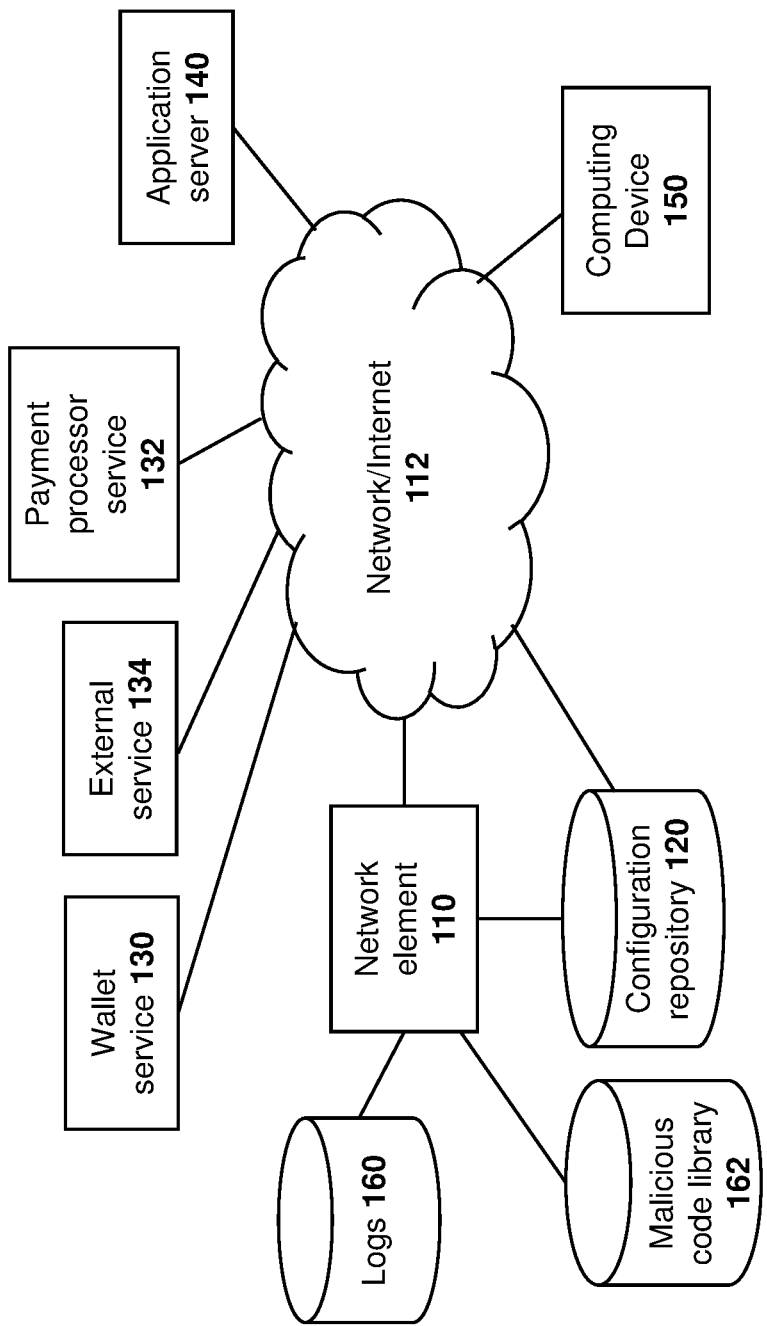
FIG. 1 is a block diagram showing an example computing environment capable of being used with the embodiments of the present disclosure.

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with the embodiments of the present disclosure, methods and systems are provided to facilitate the detection of malicious code insertion in a checkout operation.

Large e-commerce platforms can be targets for malicious actors to attempt to breach security protocols and gain access to sensitive information such as credit card data. Such malicious actors may use identical domains across multiple shops and multiple incidents, indicating direct targeting of the e-commerce platform.

Access to the files used for editing a checkout operation can be gained in various ways. One way that such actors may gain access to sensitive information is to compromise an account for a particular merchant, where such account has the capability to edit a checkout process, and to insert malicious code, such as malicious JavaScript (JS) code, into the checkout operation. In particular, checkout operations code is the code which manages any customization of the checkout operation for a retailer.

Credentials for such compromised account may make their way to bad actors who use them to log in and access the checkout operation files. The bad actors may then insert deliberately messy code that is custom-built and constantly evolving for a checkout operation use case, typically to perform credit card skimming. They often obfuscate the code or make the code look legitimate, such that it is hard for the merchant to determine what the code is doing or that something is amiss.

Both legitimate and illegitimate checkout customizations often involve calls to other servers for additional information, processing or storage. Thus, it is difficult to determine if calls to third party servers from newly injected code is malicious or not.

Such malicious code may be unnoticed for a long period of time, potentially resulting in potentially thousands of credit cards or other information of customers being compromised.

In order to overcome this, a computer system may be implemented with checks for finding instances of malicious code insertion into the checkout operations of a merchant.

In particular, as described below, a content security policy may be implemented for a web page to monitor transactions, and a monitoring engine at the computing system may apply heuristics to reports from such content security policy to find potential suspicious activities. Rules for the monitoring engine may be established to determine when a transaction is suspicious.

Once the content security policy and monitoring engine flag a transaction as being suspicious, additional checking may be performed. In one case, the additional checking may be a determination that a checkout operation file has been edited within a threshold time period. If so, the editing of the checkout operation file can be examined to find whether any unusual characteristics exist for the editing of the checkout operation file.

In other cases, instead of, or in addition to, the checking for circumstances surrounding the modification of the checkout operation file or files, the code of the actual checkout operation can be analysed. Specifically, the checkout operation file or files may be extracted (e.g., scraped) and parsed to look for potentially malicious code segments. For example, the code can be compared to a library of known malicious code segments, and a match between the code in the checkout operation file or files and any segment in the library may indicate that the checkout operation has been compromised. Based on a correlation between the content security policy, circumstances surrounding the modification of the checkout operation file, and/or the scraping of the checkout operation code, an action may be performed.

On both finding that the transaction is suspicious by the monitoring engine and based on additional checking, the correlation may lead to an action being performed. In some cases, a confidence score may be assigned based information from the monitoring engine and the additional checking.

The action taken may include providing an alert to a monitoring centre, with various degrees of severity depending on the confidence score. In other cases, the action may involve rolling back checkout operations code to a previous version. In other cases, the action may involve suspending a merchant's site to avoid further customer data being compromised. Such suspension may allow the condition to be rectified so that the site can then be safely reinstated. Other types of actions are possible.

Various possible embodiments and variations of the subject matter of the present disclosure are described in greater detail below.

Computing Environment

The embodiments of the present disclosure could be implemented on any computer system. One example operating environment for the present disclosure is provided with reference to FIG. 1. However, the embodiment of FIG. 1 is merely provided as an example, and different computing environments are possible.

In the embodiment of FIG. 1, a network element 110 may be any server or group of servers located within a network. For example, network element 110 may be part of a cloud service such as an e-commerce platform. In other cases, network element 110 can be a server such as a web server associated with the merchant or an e-commerce platform. In other cases, network element 110 may consist of a plurality of servers. Other options for network element 110 are possible.

Network element 110 may communicate, through a local or wide area network such as Internet 112, to other computing devices and services. For example, in one case, network element 110 may communicate with a configuration repository 120, either directly or through Internet 112. Configuration repository 120 can store configuration information for checkout operations that can be used by network element 110 to determine information that may be needed by the checkout operation.

In some cases, configuration repository 120 can include information about products or services for checkout customization, checkout process flow, special requirements for the shop using the checkout operation, special requirements for a subset of goods or services using the checkout operation, layouts, among other options.

In some embodiments, a checkout operation may involve communication with a wallet service such as wallet service 130. Wallet service 130 may, in some cases, belong to an operator of an e-commerce platform. In other cases, wallet service 130 may belong to a third-party wallet or service.

Additionally, or alternatively, a checkout operation may involve communication with a payment processor service 132. For example, such payment processor service may allow the use of a credit card during a checkout operation.

Additionally, or alternatively, a checkout operation may involve communication with other external services 134. For example, such external services may complement the checkout operation by providing layout or other information to the checkout operation, and/or may provide certain processing for the checkout operation, among other functionality.

Further, the embodiment of FIG. 1 includes an application server 140 which may provide applications to facilitate checkout operations for a merchant. Such application server 140 may therefore provide applications to network element 110 or can run applications which can then communicate with network element 110, regarding various information elements that are needed for a checkout operation.

Computing device 150 may be any device capable of communicating, for example through network or Internet 112, to network element 110. For example, computing device 150 may be a customer's home or work computer, laptop, mobile device, tablet, smartphone, among other such options.

In other cases, computing device 150 may be associated with a merchant and be used to configure a shop, including customizing checkout operations in some cases.

Logs may be stored in a log repository 160, which may be accessible to network element 110. Such logs may include logs of modifications to checkout operations code in some cases.

Further, in some embodiments, a malicious code library 162 may be maintained in a network and be accessible to network element 110.

The elements in FIG. 1 are merely provided as examples, and in some cases further servers, repositories or services may be part of such computing environment. In other cases, various servers, modules, repositories or services shown in FIG. 1 may be omitted from the computing environment. Therefore, the embodiment of FIG. 1 is merely provided as an illustration of one example computing environment in which the embodiments of the present disclosure may operate.

Network element 110, computing device 150, as well as the various services and repositories of FIG. 1 could be implemented on any type of, or combination of, computing devices. For example, one simplified computing device that may perform the embodiments described herein is provided with regard to FIG. 2.

Figure 2:
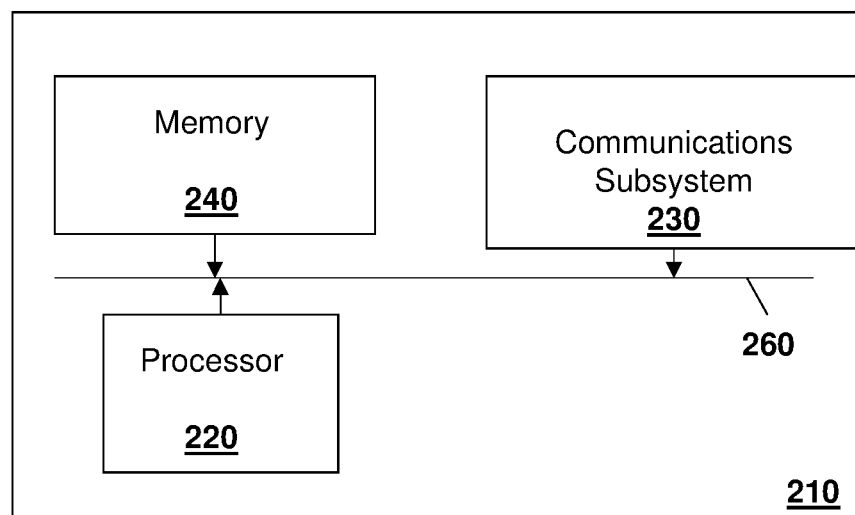
FIG. 2 is a block diagram showing a simplified computing device capable of being used with the embodiments of the present disclosure.

In FIG. 2, computing device 210 includes a processor 220 and a communications subsystem 230, where the processor 220 and communications subsystem 230 cooperate to perform the methods of the embodiments described herein.

The processor 220 is configured to execute programmable logic, which may be stored, along with data, on the computing device 210, and is shown in the example of FIG. 2 as memory 240. The memory 240 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 220 may also be implemented entirely in hardware and not require any stored program to execute logic functions.

Alternatively, or in addition to the memory 240, the computing device 210 may access data or programmable logic from an external storage medium, for example through the communications subsystem 230.

The communications subsystem 230 allows the computing device 210 to communicate with other devices or network elements.

Communications between the various elements of the computing device 210 may be through an internal bus 260 in one embodiment. However, other forms of communication are possible.

Content Security Policy

As defined by the www.W3.org working group, a Content Security Policy (CSP) is a tool which developers "can use to lockdown their applications in various ways, mitigating the risk of content injection vulnerabilities such as cross-site scripting, and reducing the privilege with which their applications execute."

Specifically, in accordance with one embodiment of the present disclosure, a content security policy or other similar tool may be used to actively monitor incoming and outgoing requests from a checkout operation to third party or external domains. As used herein, an external domain is a domain that is external to the e-commerce platform, merchant, shop, or similar entity.

A web designer may add a content security policy, for example by inserting the policy in the hypertext markup language (HTML) header of the shop web page. The CSP may include reporting capabilities, for example to a particular logging repository 160.

Therefore, anytime a website is used and reporting requirements are met, a report or log based on the CSP requirements is generated.

Figure 3:
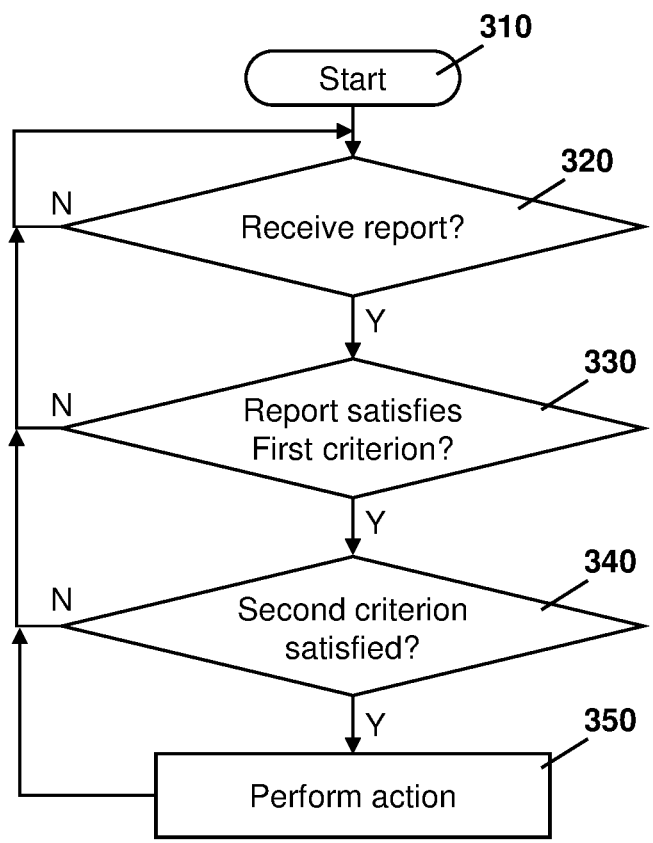
FIG. 3 is a process diagram showing an example process for performing an action based on malicious code insertion into a checkout operation.

A monitoring engine on a server or cloud service, such as network element 110, may monitor reports. Such tool may be configured with constraints for monitoring the requests. Reference is now made to FIG. 3, which shows one process according to the embodiments of the present disclosure.

In the embodiment of FIG. 3, the process starts at block 310 and proceeds to block 320 in which a check is made to determine if a report is received. As used herein, a report may be an entry into a log file or may be some other form of messaging to a network server 110.

If a report is not received, the process proceeds to block 320 and continues to monitor for a report.

Once a report is received, the process proceeds to block 330 in which a monitoring engine may actively compare or correlate a report logged from a CSP with one or more criterion/criteria to determine whether a transaction should be flagged. Specifically, on receiving such report back, the monitoring engine at a network element may use heuristics (a first criterion) and compare information in the report with known security threats.

In one case, a CSP may require a report to be generated when an external domain, as for example provided by a Uniform Resource Locator (URL), is being contacted during a checkout operation. If a domain outside of the e-commerce platform is contacted, a report such as a log of the event, may occur. In other cases, the report may be generated when an external domain provides information to the checkout operation.

For example, such heuristics may compare the domain being contacted with an "allow list" of known safe domains. An allow list may in some cases be referred to as a pass list or a white list. The monitoring engine may deem the request safe and thus discard the request if the domain being contacted is on the allow list. Such allow list may include trusted third parties, such as partners or large payment service providers, known to the e-commerce platform or the merchant itself.

Conversely, the report may also be compared with a list of known unsafe domains (referred to herein as a deny list, and sometimes also referred to as a block list or a black list) and the report may be flagged if the domain being contacted is on the list of known unsafe domains. Such a list of known, unsafe domains may be maintained based on past attacks, open-source intelligence such as tuning into other communities, electronic commerce platforms, security firms, among others, who list malicious domains. Further, the list may be maintained by the e-commerce platform based on attacks on one or more shops for the benefit of other shops. The match may be a partial match based on portions of the Uniform Resource Locator in some cases, for example a particular URL prefix, domain, or similar portion.

In some cases, the report may be generated based solely on outgoing contact to an external domain from the checkout operation. In other cases, incoming communications from an external domain may also, or instead, cause the report to be generated.

Further, in some cases, the heuristics may be applied to unknown domains. For example, if a brand-new domain is showing up in reports from multiple different merchants at around the same time, this can cause suspicion.

Figure 4:
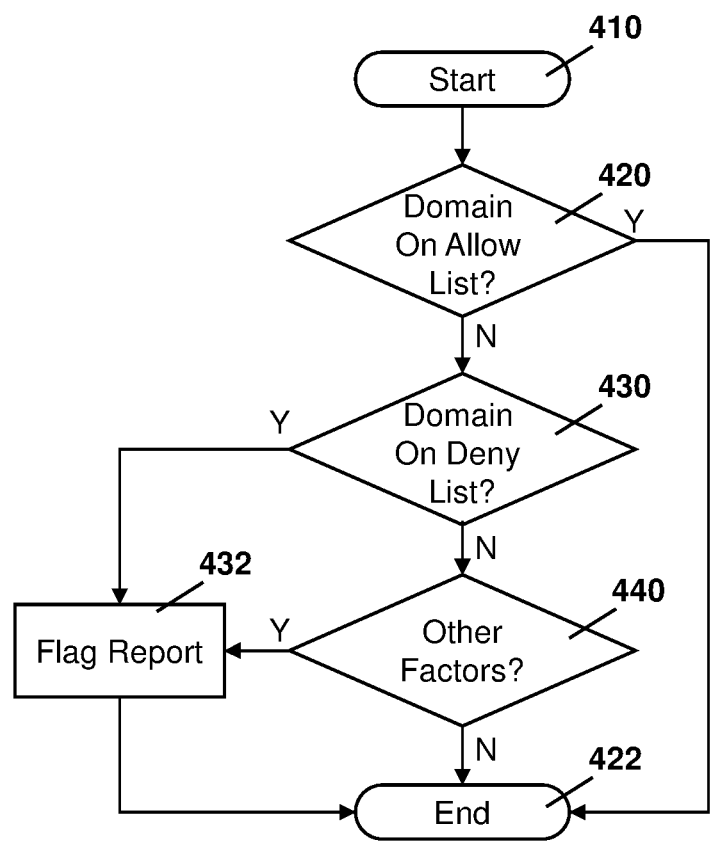
FIG. 4 is a process diagram showing an example process for determining that a first criterion is satisfied.

An example process flow for such checking at the monitoring engine is shown with regards to FIG. 4. In particular, the process of FIG. 4 starts at block 410 when a report is received at the monitoring engine regarding an incoming or outgoing call to an external domain. As indicated above, the external domain may in some cases be external to the owner of the shop or e-commerce website. In other cases, the external domain may be external to an e-commerce platform hosting a plurality of merchants.

The process then proceeds to block 420 in which a check is made to determine whether the external domain is on an allow list. Such allow list may be built and maintained by any of the e-commerce platform, the merchant, shop, among others. If the external domain is on the allow list then the call is deemed safe and the process proceeds to block 422 and ends.

Conversely, if the external domain is not on the allow list, the process proceeds to block 430 in which a check is made of whether the external domain is on the deny list. A deny list may be created and maintained as described above. If the external domain is on the deny list then it is known to be a malicious domain, and the process then proceeds to block 432 in which the report is flagged. Flagging the report may comprise sending the report to a processing engine for further processing and to determine an action to be performed, as described below.

From block 432 the process proceeds to block 422 and ends.

If the external domain is not on the deny list (or the allow list) then the process proceeds to block 440 in which a check is made for other factors. For example, if suddenly multiple shops are calling this external domain when the external domain was not previously called, this may be an indication of malicious code, and the process may proceed from block 440 to block 432 to flag the report.

The external domain could be logged for further investigation in some cases.

Other factors could also be considered at block 440. If none of the other factors are present, then the process proceeds to block 422 and ends.

Rather than, or in addition to, checking for incoming or outgoing calls to external domains, in other cases, the CSP may generate a log entry which may be analyzed to determine if other conditions are met. Additionally, or alternatively, the CSP may generate a report when other conditions are met. For example, the log and/or report may be checked to find when the length of a web request exceeds a threshold, and the heuristics may check whether the link for the request can be indicative of a malicious code insert. Specifically, in some attacks, web requests with a customer's private information embedded therein are provided to a malicious server. The malicious server can then extract the private information from the web request.

In some cases, a string having a minimum amount of encoded (e.g., base64 encoded) information such as URL parameters may also be indicative of the first criterion being satisfied.

Therefore, the first criterion may be satisfied based on one or more events.

Once the report is generated, the monitoring engine may, at block 330, determine whether the report satisfies a first criterion. In this case the first criterion may be both the length of the request and a check whether the request includes private information.

Other types of monitoring and heuristics are possible, and the present disclosure is not limited to any particular heuristics checked by the monitoring engine.

The check by the monitoring engine of whether the first criterion is satisfied can therefore in some cases involve checking whether any one of, or a plurality of, criteria are satisfied.

In still further cases, a confidence score could be assigned to the report, where the confidence score could indicate the probability that the report is for malicious activity. For example, if the domain is on the allow list, a very low confidence score could be assigned to the report. If the external domain is on the deny list, a very high confidence score is assigned. If the domain is on neither the allow or deny list, then the confidence score may be based on the other factors described herein, and in order to flag the report the confidence score may need to meet a threshold value.

From block 330, if the first criterion is not satisfied by the report, the process proceeds from block 330 back to block 310 to continue to monitor reports.

Conversely, when the first criterion is satisfied, meaning that there is potentially malicious activity, the suspicious activity may be reported to a processing engine, as described below. In this regard, the process proceeds from block 330 to block 340.

Processing Engine

Output from the monitoring engine may be provided to a processing engine, which may be on a server or cloud service, such as a network element 110, which may be the same or a different network element 110 on which monitoring engine is found.

Referring to FIG. 3, at block 340 the processing engine may determine that a second criterion satisfied, indicating malicious activity during a checkout operation is likely. In some cases, the second criterion could be based on an analysis of checkout operations code. In other cases, the second criterion could be based on checkout operation files editing logs. In other cases, other factors for determining whether a second criterion is satisfied are possible. Each is described below.

Code Analysis

In some embodiments, edits to the actual checkout operations code could be analysed (collected/scraped & parsed). This may be done either at the time that the new code was injected or at the time that another entity such as the monitoring engine flags activity as suspicious.

In some cases, the code analysis may involve checking the checkout operations code, or the inserted ("delta") code, against known malicious code.

In other cases, the code analysis may involve determining whether the new code is accessing credit card parameters or variables, or other sensitive customer information.

In some cases, the analysing may involve determining whether the new code sends the credit card data elsewhere. For example, the credit card information may be sent elsewhere through URL parameters or in method calls to a third-party server. Other options are possible.

In some cases, a check may be made to determine whether the code is obfuscated and whether the code may be un-obfuscated for further analysis. In some cases, the check may also determine whether the obfuscation was done by a known obfuscator.

The code analysis may be performed by any process or engine, including the processing engine described herein, or a process or engine associated with the processing engine.

Figure 5:
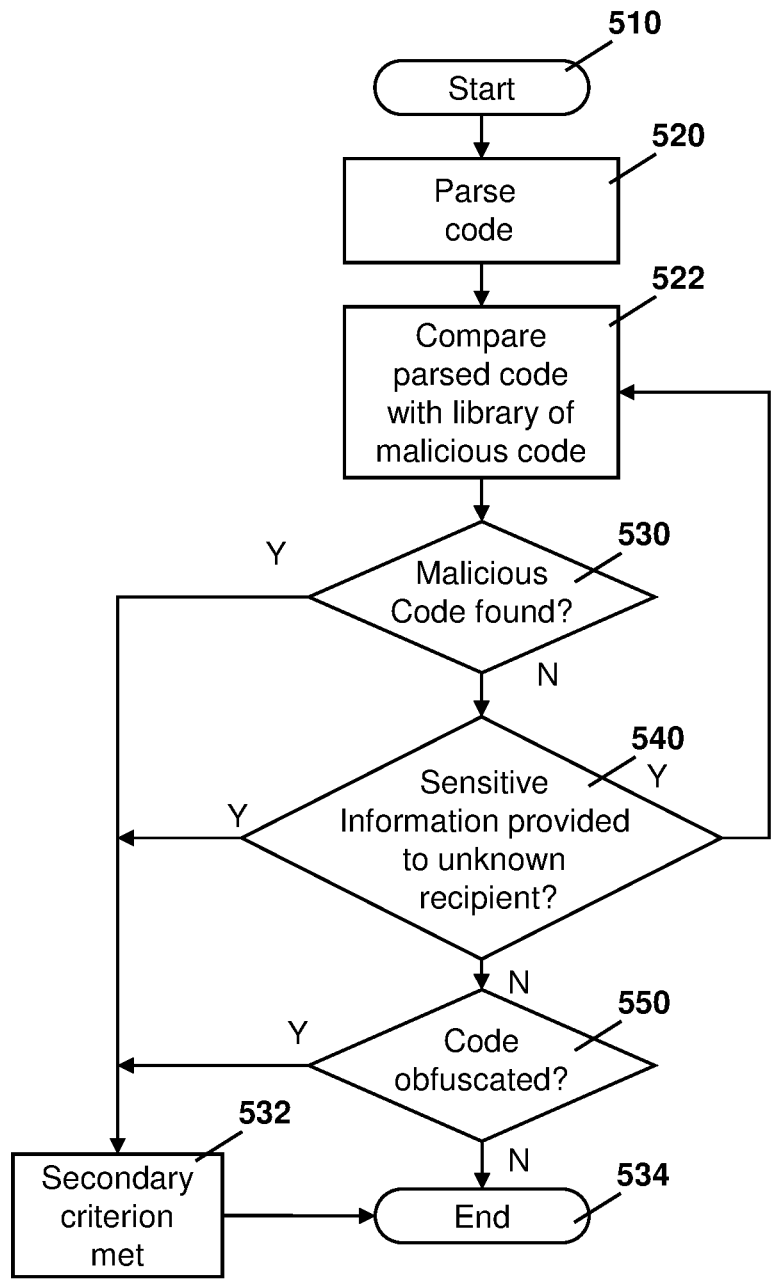
FIG. 5 is a process diagram showing an example process for determining that a second criterion is satisfied based on code parsing and analysis.

One example process for performing code analysis is described with regards to FIG. 5. However, the process of FIG. 5 is merely provided as an example, and in other cases the analysis of the second criterion may involve different steps.

The process of FIG. 5 starts at block 510 and proceeds to block 520 in which the checkout operation code may be parsed. In some cases, the parsing may involve the entire checkout operation code. In other cases, the parsing may involve only the new code inserted.

The parsing may break the code insertion into routines or segments in some cases. In some cases, the parsing may isolate particular calls, such as server calls to external servers. Other options are possible.

From block 520 the process proceeds to block 522 in which the parsed code may be analysed for malicious code insertions. For example, this may involve comparing the parsed code with a library of malicious code identified in the past by the e-commerce platform, by security experts, by merchants, or by others. Such comparison may in some cases involve artificial intelligence engines trained on the detection of malicious code in some cases. In other cases, the comparing may involve the comparison of known malicious code with the code inserted into the checkout operation. In other cases, "matching" may occur based on known malicious code segment or segments known to be characteristic of malicious code. In other cases, heuristics such as call patterns or code patterns characteristic of malicious behavior/code could be used for the analysis. Other options are possible.

The process then proceeds to block 530 in which a check is made to determine whether malicious code is detected based on the comparison at block 522. If malicious code is detected, the process proceeds to block 532 in which the second criteria is found to be satisfied.

From block 532 the process proceeds to block 534 and ends.

Conversely, if no malicious code is found at block 530, the process may, in some embodiments, proceed to block 540 in which an analysis of the code may be performed to determine whether sensitive information is being provided to an external server. In this case, the sensitive information may be credit card information, customer data, or other such information.

The check at block 540 may further determine in some cases whether the external resource is known to be on an allow list, in which case the provision of the sensitive information may be ignored.

From block 540, if sensitive information is found to be provided to an external server that is either unknown or on a deny list, the process proceeds to block 532 in which the second criterion is found to be satisfied.

Conversely, if the analysis at block 540 does not find sensitive information is being provided to an unknown recipient or a recipient on a deny list, the process may in some embodiments proceed to block 550. At block 550 a check may be made to determine whether the code is obfuscated in an attempt to make it difficult to determine what the code is doing. Specifically, in some cases, even if the code is obfuscated, this may only determine malicious code depending on certain criteria, such as whether obfuscated inline code is allowed or not from partners, among other factors. Further, the use of certain tools for the obfuscation may further be indicative that malicious code was inserted into the checkout operation.

If the code is found to be obfuscated to prevent analysis of the code, the process may proceed to block 532 in which the second criteria is found to be satisfied.

Conversely, if the code is not found to be obfuscated the process may proceed from block 550 to block 534 and ends.

While the example of FIG. 5 includes checks at blocks 530, 540 and 550, in some cases various of these checks may be omitted. In other cases, different checks could be used, and these other checks could replace any of the checks at blocks 530, 540 or 550, or be added to the checks of FIG. 5.

Further, in some cases block 532 may be used to create a confidence score that the second criterion is met. In this case, the results of multiple checks could contribute to the confidence score that malicious code has been inserted into the checkout operation. In order for the second criterion to be satisfied, in some cases the confidence score may need to exceed a defined threshold.

Modification of a Checkout Operations Code

A further source of information with regard to potential malicious activity may be with regard to activity logs dealing with the checkout operation code. This check of activities on the checkout operations code may be performed instead of, or in addition to, code analysis as described above.

Various activities with regards to the checkout operations code may be indicative of malicious activity.

For example, in one embodiment, an indication of malicious activity may be a recent edit to the checkout operations code. Specifically, if the checkout operations code was changed recently, e.g., within a threshold time period, this may be indicative of the possibility that malicious code was inserted into such checkout operations code.

Further, the characteristics of the change may also be considered. In particular, if an account that modified the checkout operations code is doing so for the first time, then this may indicate that the transaction was unusual. Specifically, if a staff account has permission to change a file, but has never done so in the past, and such change is not part of the typical role, work or behavior for such staff member, this may be flagged as meeting a criterion for unusual activity.

In other cases, if the change was made from a computing device in a new location not previously seen for this account, this may be indicative of the account being compromised and may be flagged as meeting a criterion for unusual activity.

In other cases, if the change was made from a computing device using an IP address that belongs to a hosting provided, this may be indicative of the account being compromised and may be flagged as meeting a criterion for unusual activity.

Further, if the change was made from a new device or new user agent such as a new browser, in some cases this may also be indicative of an unusual transaction.

Further, in some cases, the time between the login and the change in the checkout operations file could be monitored and if it is below a threshold value, then this may indicate that the code change to the checkout operation meets a criterion for unusual activity.

The logs may be provided to a processing engine or other entity, as described herein.

Figure 6:
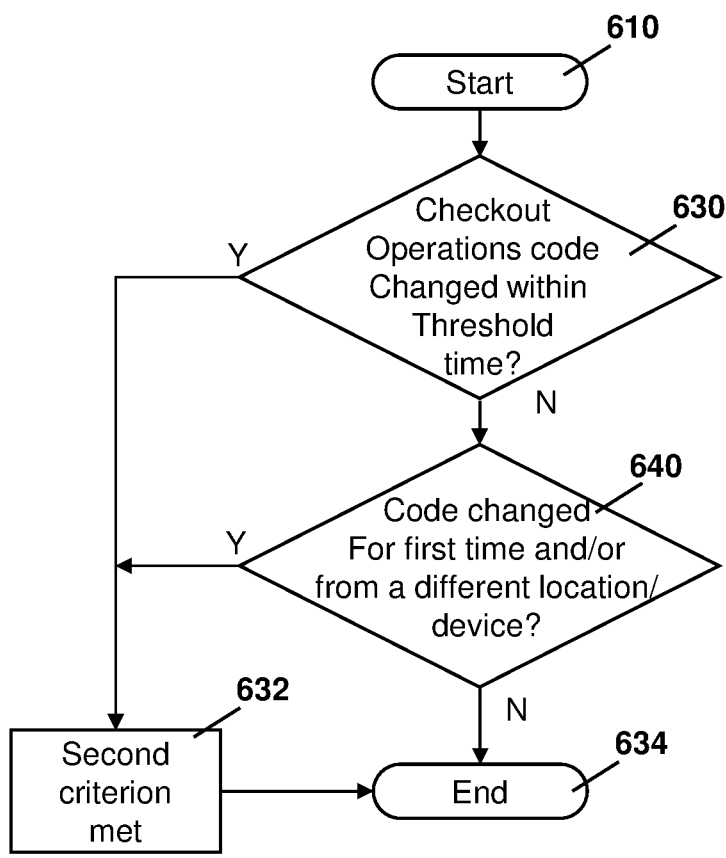
FIG. 6 is a process diagram showing an example process for determining a second criterion is satisfied based on logs for checkout operation code changes.

One example process for determining whether a second criterion is satisfied is provided with regards to FIG. 6. However, the embodiment of FIG. 6 is merely provided as an example, and in other cases the log files for the checkout operations code could be analysed using a different process.

In the embodiment of FIG. 6, the process starts at block 610 and proceeds to block 630 in which a check is made to determine whether the checkout code has been edited within a threshold time period. For example, the check at block 630 may check logs for the checkout operations code to see if a timestamp for changes to a file fall within a threshold time. The threshold time period may be fixed in some cases and be set by an administrator of a shop or an e-commerce platform, for example.

In other cases, the threshold time period may be set based on various factors, such as the number of transactions that a shop processes every hour or every day on average. A shop that processes more transactions may have a shorter time period since a malicious transaction may be noticed sooner. Other options for the threshold time period are possible.

From block 630, if the checkout operation has been changed within a threshold time period then this is indicative of malicious code insertion and the process proceeds to block 632 in which the second criterion is deemed satisfied.

From block 632 the process proceeds to block 634 and ends.

If the check at block 630 finds that the checkout operations file has not been changed within a threshold time then the process may, in some cases, continue to block 640.

Further, in some embodiments (not shown), if the check at block 630 determines that the checkout operations code has been changed within a threshold time, then a confidence score that the second criterion is met may be increased, but the process could for example continue to block 640.

At block 640 the process may check for indicators that changes to the checkout operations code were unusual. For example, this may include that an employee not normally tasked with changing the checkout operations code made the changes, that the changes were made from a computer or device that has never made such changes before, that the changes were made from a location, Internet Protocol (IP) address, subnet, or other location identifier that has not been used before, and/or that an employee that has never made changes to the checkout operations file has made the changes.

In some embodiments, if the check at block 640 finds that the changes to the checkout operations code were unusual then the process may proceed to block 632 in which it is determined that the second criterion is satisfied.

Alternatively, finding that changes to the checkout operations code were unusual could contribute to a confidence score that malicious code has been inserted. In this case, after the checks, the confidence score could be checked against a threshold, and if the confidence that malicious code has been inserted is higher than the threshold then the second criteria is determined to be satisfied.

While the embodiment of FIG. 6 shows a plurality of checks, in some cases the check for the second criterion being satisfied may involve only one, or a subset of the checks of the embodiment of FIG. 6.

Further, as provided above, the second criterion being satisfied may be based solely on code parsing and analysis, based solely on logs from the checkout operations code, or based on a combination of the two.

Action for a Shop

The check at block 340 determines that the second criterion is satisfied, for example with logs based on account activity, code analysis, and/or output from other sources, for example using the process of FIGS. 5 and/or 6, this information may then be provided to or obtained by a processing engine. For example, the processing engine may use Security Information and Event Management (SIEM) software to analyze data.

Such processing engine may correlate the data from the two or more data sources to determine whether it is likely that a malicious code insertion has been made. Specifically, based on the information monitored above, a confidence level may be calculated for each request or each checkout/merchant to determine the likelihood of malicious activity. For example, activities involving known unsafe domains are immediately flagged as malicious with 100% confidence. Requests to known safe domains are high confidence non-malicious behaviours.

As another example, a previously unseen domain that correlates with recent checkout operation file changes in multiple stores within a short time period is also a high confidence combination of information that likely indicates malicious behaviour.

Referring again to FIG. 3, if the check at block 340 including the analysis by the processing engine finds that the second criterion is not satisfied then the process proceeds back to block 320 to continue to monitor for other reports.

Conversely, if the check at block 340 including the analysis by the processing engine finds that the second criterion is satisfied, the process may then proceed to block 350 in which an indication of malicious activity may be found and an action may be performed.

Actions may include alerts to monitoring stations or key administrators, or some automated action.

In some embodiments, the action that is taken may be based on a confidence level. For example, any requests that have high confidence of malicious behaviour may result in notifications and/or automated actions taken by the system. Alerts may include notifying on-call incident response teams at either the e-commerce platform or at the affected merchant(s).

Automated actions may include automatically rolling back the checkout operations file to a previous version and confirming, for example using logs, that no further requests have been made to the flagged domain(s).

Automated actions may further include suspending checkout operations for a merchant while the issue is investigated.

Automated actions may also include automatically locking the account from which the checkout operations file modifications occurred.

Automated actions may also include adding the domains from the requests initially logged by the CSP to either the list of known unsafe domains, or an additional maintained list of "potentially unsafe domains".

One or more of the automated actions described above can be applied in combination by the system.

The degree of actions can, in some cases, be based on a confidence level determined. For example, in a case in which a high confidence level of malicious activity is found, a first action can be taken, while in the case of a lower confidence level, a second action can be taken.

While the above describes a reactive situation, in other cases, more proactive situations could be employed. For example, in some cases the changing of a checkout file could precipitate code scraping and analysis, or reviewing the account login details, in order to make determinations on whether potential malicious activity is detected.

Checking Other Shops

In addition, an action may include checking other shops to see whether malicious code was inserted elsewhere.

Figure 7:
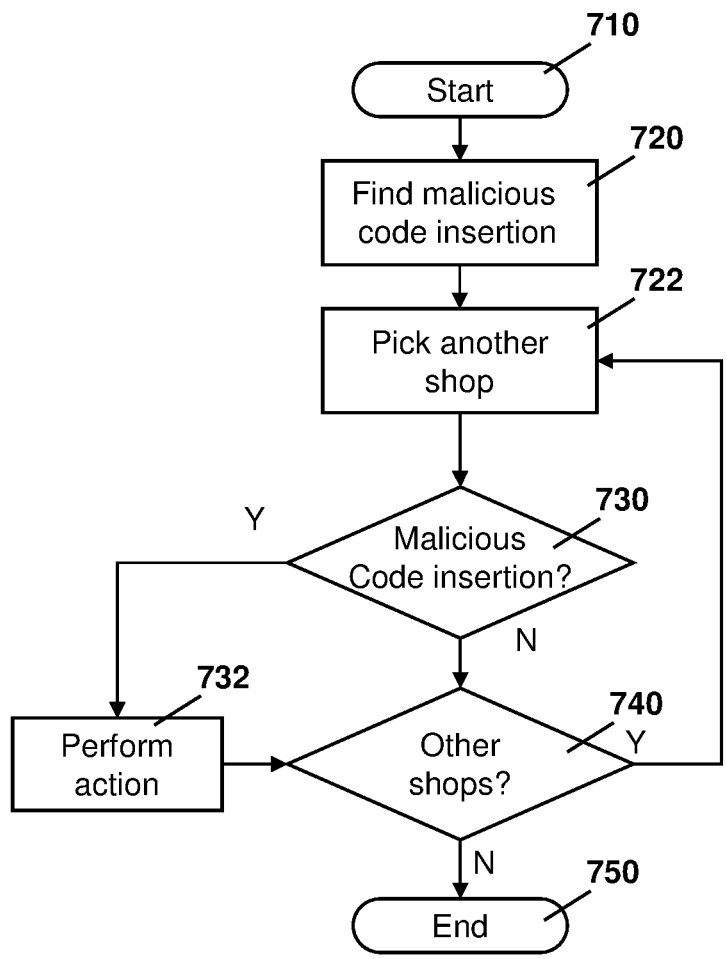
FIG. 7 is a process diagram showing an example process for checking other shops once one shop is found to have had malicious code inserted into checkout operations code.

In particular, one example process for checking other shops is shown with regards to FIG. 7. However, the process of FIG. 7 is merely provided for illustration, and is not meant to be limiting.

The process of FIG. 7 starts at block 710 and proceeds to block 720, in which a malicious code insertion into a checkout operation is found. This may, for example, be done using any of the processes of FIGS. 3 to 6 above.

From block 720 the process proceeds to block 722 in which another shop administered by the e-commerce platform is selected.

The process may then proceed to block 730 in which a check is made to determine whether a malicious code insertion has occurred with the selected shop. This may be done by using the processes of FIGS. 3 to 6 above in some cases. In other cases, the specific malicious code found previously could be scanned for in the checkout operations code, among other options.

From block 730, if malicious code is found then the process proceeds to block 732 in which an action is performed. The action may be similar to the action described with regards to block 350 from FIG. 3, and may include alerts or automated actions.

From block 732, or if no malicious code is found in the shop at block 730, the process proceeds to block 740 in which a check is made to determine whether other shops need to be checked. If yes, the process proceeds from block 740 to block 722 in which another shop is chosen.

If all of the shops have been checked, the process proceeds from block 740 to block 750 and ends.

Based on the embodiment of FIG. 7, once malicious code is found in one shop, other shops can be quickly assessed for similar malicious code.

The embodiments described herein allow for identification of malicious code insertion into a checkout operation and performing an action such as providing an alert or rolling back checkout operations code in response to the identification of the malicious code insertion.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for detecting malicious code injection into checkout operations, the method comprising:
   receiving a report regarding a checkout operation;
   determining based on the report that a checkout operation includes one or more events satisfying a first criterion, the determining that the first criterion is satisfied including determining that a call was made to a Uniform Resource Locator matching a particular list;
   determining that how a modification to customizable software code related to the checkout operation was performed satisfies a second criterion;
   responsive to the satisfaction of the first criterion and the second criterion, providing an indication of a detection of a potential malicious code injection into the checkout operation; and
   responsive to the indication, triggering an action to mitigate the potential malicious code injection;
   wherein determining that the second criterion is satisfied comprises determining that the modification was performed using an account that has not made modifications to a checkout operation file within a defined period.

2. The method of claim 1, wherein the action includes a rollback of a code change associated with the potentially malicious code injection.

3. The method of claim 1, wherein the action includes locking a user account that made the modification of the customizable software code.

4. The method of claim 1, wherein the second criterion includes modification of customizable software code related to the checkout operation within a threshold time frame.

5. The method of claim 1, wherein determining that the first criterion is satisfied includes determining that a call string exceeds a threshold size.

6. The method of claim 1, wherein determining that the first criterion is satisfied includes identifying a call string with sensitive information embedded therein.

7. The method of claim 1, wherein determining that the second criterion is satisfied includes determining that the modification was performed from a new location.

8. The method of claim 1, wherein determining that the second criterion is satisfied including determining that the modification was performed using a new computing device.

9. The method of claim 1, further comprising establishing a confidence level that a malicious activity has occurred, and wherein the action is selected based on confidence level.

10. The method of claim 1, further comprising:
    analyzing the checkout operations file for malicious code segments prior to performing the action.

11. The method of claim 7, wherein the action further comprises evaluating checkout operations for other shops.

12. The method of claim 1, wherein the report is received from a user device based on a content security policy of a web page associated with the checkout operation.

13. A computer system for detecting malicious code injection into checkout operations, the computer system comprising:
    a processor coupled to a memory; and
    a communications subsystem, wherein the computer system is configured to:
    receive a report regarding a checkout operation;
    determine based on the report that a checkout operation includes one or more events satisfying a first criterion, the determining that the first criterion is satisfied including determining that a call was made to a Uniform Resource Locator matching a particular list;
    determine that how a modification to customizable software code related to the checkout operation was performed satisfies a second criterion;
    responsive to the satisfaction of the first criterion and the second criterion, provide an indication of a detection of a potential malicious code injection into the checkout operation; and
    responsive to the indication, trigger an action to mitigate the potential malicious code injection;
    wherein determining that the second criterion is satisfied comprises determining that the modification was performed using an account that has not made modifications to a checkout operation file within a defined period.

14. The computer system of claim 13, wherein the action includes a rollback of a code change associated with the potentially malicious code injection.

15. The computer system of claim 13, wherein the action includes locking a user account that made the modification of the customizable software code.

16. The computer system of claim 13, wherein the second criterion includes modification of customizable software code related to the checkout operation within a threshold time frame.

17. The computer system of claim 13, wherein determining that the first criterion is satisfied includes determining that a call string exceeds a threshold size.

18. A non-transitory computer readable medium for storing instruction code for detecting malicious code injection into checkout operations, which, when executed by a processor of a computer system cause the computer system to:
    receive a report regarding a checkout operation;
    determine based on the report that a checkout operation includes one or more events satisfying a first criterion, the determining that the first criterion is satisfied including determining that a call was made to a Uniform Resource Locator matching a particular list;
determine that how a modification to customizable software code related to the checkout operation was performed satisfies a second criterion;
responsive to the satisfaction of the first criterion and the second criterion, provide an indication of a detection of a potential malicious code injection into the checkout operation; and
responsive to the indication, trigger an action to mitigate the potential malicious code injection;
wherein determining that the second criterion is satisfied comprises determining that the modification was performed using an account that has not made modifications to a checkout operation file within a defined period.

* * * * *